US008459553B2

(12) United States Patent
Bang

(10) Patent No.: US 8,459,553 B2
(45) Date of Patent: Jun. 11, 2013

(54) MEDIUM PROCESSING APPARATUS, MEDIUM PROCESSING METHOD, AND FINANCIAL DEVICE

(75) Inventor: Youngsik Bang, Kyeonggi-do (KR)

(73) Assignee: LG-CNS Co. Ltd., Seoul (KR)

( * ) Notice: Subject to any disclaimer, the term of this patent is extended or adjusted under 35 U.S.C. 154(b) by 0 days.

(21) Appl. No.: 13/190,802

(22) Filed: Jul. 26, 2011

(65) Prior Publication Data

US 2012/0024944 A1 Feb. 2, 2012

(30) Foreign Application Priority Data

Jul. 29, 2010 (KR) ........................ 10-2010-0073594

(51) Int. Cl.
*G06K 7/00* (2006.01)

(52) U.S. Cl.
USPC ............ 235/435; 235/449; 235/450; 235/493

(58) Field of Classification Search
USPC .................................. 235/435, 449, 450, 493
See application file for complete search history.

(56) References Cited

U.S. PATENT DOCUMENTS 4,574,190 A * 3/1986 Nishimura .................... 235/449
2006/0202691 A1* 9/2006 Komatsu et al. .............. 324/252

FOREIGN PATENT DOCUMENTS

KR 10-1999-0006725 A 1/1999
KR 10-2000-0008110 A 2/2000
KR 10-2002-0018442 A 3/2002

OTHER PUBLICATIONS

Notice of Allowance dated Apr. 30, 2012 in Korean Application No. 10-2010-0073594, filed Jul. 29, 2010.

* cited by examiner

*Primary Examiner* — Kristy A Haupt
(74) *Attorney, Agent, or Firm* — Saliwanchik, Lloyd & Eisenschenk

(57) ABSTRACT

A medium processing apparatus is provided. The medium processing apparatus comprises an MR sensor, one or more differential amplifiers, a storage, and a controller. The MR sensor comprises a plurality of detection elements configured to detect a magnetic component of a medium. The one or more differential amplifiers receive respective output signals of two detection elements among the plurality of detection elements to subtract and amplify the received signals. The storage stores various pattern information of a magnetic component signal for the medium. The controller compares the pattern information, stored in the storage, with magnetic component signals respectively outputted from the detection elements and a magnetic component signal outputted from the one or more differential amplifiers to determine authenticity of the medium.

13 Claims, 7 Drawing Sheets

MEDIUM PROCESSING APPARATUS, MEDIUM PROCESSING METHOD, AND FINANCIAL DEVICE

CROSS-REFERENCE TO RELATED APPLICATION

This application claims the benefit under 35 U.S.C. §119 of Korean Patent Application No. 10-2010-0073594, filed on Jul. 29, 2010, which is hereby incorporated by reference in its entirety.

BACKGROUND

The present disclosure relates to a medium processing apparatus, a medium processing method, and a financial device.

Generally, a financial device is a device for processing a financial business desired by a user. The financial device can deposit or withdraw a medium or automatically transfer the medium. The financial device may comprise a medium processing apparatus for recognizing a medium.

The medium processing apparatus may determine the state of a transferred medium. As an example, a medium processing apparatus may detect the magnetic component of a medium to recognize the authenticity of the medium.

BRIEF SUMMARY

Embodiments provide a medium processing apparatus, a medium processing method, and a financial device, which accurately detect the state of a medium and thus can accurately determine the authenticity of the medium.

In one embodiment, a medium processing apparatus comprises: a magnetic resistance (MR) sensor comprising a plurality of detection elements configured to detect a magnetic component of a medium; one or more differential amplifiers configured to receive respective output signals of two detection elements among the plurality of detection elements to subtract and amplify the received signals; a storage configured to store various pattern information of a magnetic component signal for the medium; and a controller configured to compare the pattern information, stored in the storage, with magnetic component signals respectively outputted from the detection elements and a magnetic component signal outputted from the one or more differential amplifiers to determine authenticity of the medium.

In another embodiment, a financial device comprises: a transfer path for transfer of a medium; and a medium processing apparatus configured to recognize a medium which is transferred along the transfer path of the medium, wherein the medium processing apparatus comprises: an MR sensor comprising a plurality of detection elements for detecting a magnetic component of the medium; a signal processor configured to process signals respectively outputted from the detection elements; and a controller configured to determine authenticity of the medium by using magnetic component signals respectively outputted from the detection elements and the processed signals.

In further another embodiment, a medium processing method comprises: detecting a plurality of first magnetic component signals for a plurality of regions of a medium; detecting one or more second magnetic component signals by processing the detected signals; and comparing a pre-stored magnetic component signal for each medium with the plurality of first magnetic component signals and the one or more second magnetic component signals to determine authenticity of the medium.

The details of one or more embodiments are set forth in the accompanying drawings and the description below. Other features will be apparent from the description and drawings, and from the claims.

DETAILED DESCRIPTION

Figure 1:
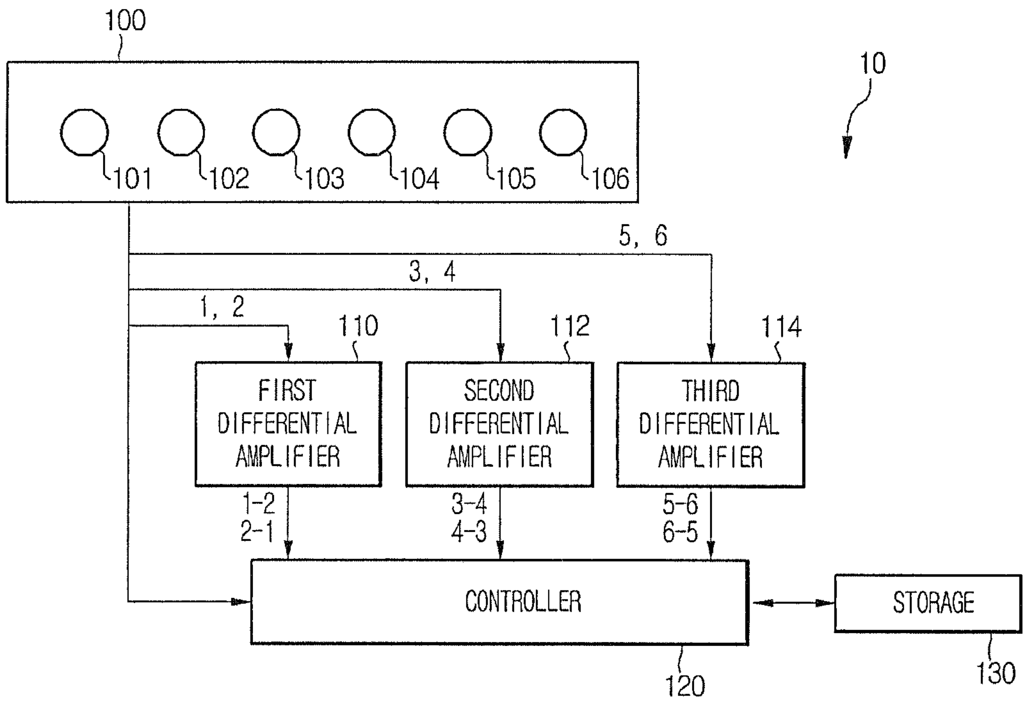
FIG. 1 is a block diagram illustrating a medium processing apparatus according to an embodiment.

Hereinafter, exemplary embodiments of the present disclosure will be described with reference to the accompanying drawings. Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

Also, in the description of embodiments, terms such as first, second, A, B, (a), (b) or the like may be used herein when describing components of the present invention. Each of these terminologies is not used to define an essence, order or sequence of a corresponding component but used merely to distinguish the corresponding component from other component(s). It should be noted that if it is described in the specification that one component is “connected,” “coupled” or “joined” to another component, the former may be directly “connected,” “coupled,” and “joined” to the latter or “connected”, “coupled”, and “joined” to the latter via another component.

FIG. 1 is a block diagram illustrating a medium processing apparatus according to an embodiment.

Referring to FIG. 1, a medium processing apparatus 10 according to an embodiment may be comprised in a financial device.

The financial device according to embodiments is a device that performs financial businesses, i.e., medium processing comprising processing such as deposit processing, giro receipt, or gift certificate exchange and/or processing such as withdrawal processing, giro dispensing, or gift certificate dispensing by receiving various media such as, e.g., paper moneys, bills, giros, coins, gift certificates, etc. For example, the financial device may comprise an automatic teller machine (ATM) such as a cash dispenser (CD) or a cash recycling device. However, the financial device is not limited to the above-described examples. For example, the financial device may be a device for automatically performing the financial businesses such as a financial information system (FIS).

The medium processing apparatus 10 comprises a magnetic resistance sensor 100 (hereinafter referred to as an MR sensor) for detecting the magnetism of a medium. The MR sensor 100 is an electronic component that converts the variation of a magnetic flux to an electric signal.

The MR sensor 100 may be disposed in a region that is overlapped with a transfer path of a medium. For example, the MR sensor 100 may be disposed on/under a medium that is transferred along a transfer path. While the medium is being transferred, the MR sensor 100 may contact the medium.

The MR sensor 100 comprises a plurality of detection elements 101 to 106. Hereinafter, for convenience, the MR sensor 100 will be described as comprising six detection elements, but in the present invention, the number of detection elements is not limited thereto. When the MR sensor 100 comprises six detection elements, the number of channels for detecting the magnetic component of a medium is six. Hereinafter, therefore, a detection element and a channel are used as the same element, and depending on the case, the detection element and the channel may be used together.

Each of the detection elements 101 to 106 detects a magnetic component, and thus, the MR sensor 100 outputs six detection signals.

The medium processing apparatus 10 may further comprise a plurality of differential amplifiers 110, 112 and 114 for subtracting and amplifying signals respectively outputted from the detection elements 101 to 106. The differential amplifiers 110, 112 and 114 comprise first to third differential amplifiers 110, 112 and 114. When an MR sensor comprises two detection elements, the medium processing apparatus 10 may comprise one differential amplifier.

Each of the first to third differential amplifiers 110, 112 and 114 subtracts and amplifies signals respectively outputted from adjacent detection elements among the detection elements 101 to 106. That is, each of the differential amplifiers 110, 112 and 114 subtracts and amplifies signals respectively outputted from a pair of detection elements. In the embodiment, the reason that each of the differential amplifiers 110, 112 and 114 subtracts and amplifies signals respectively outputted from a pair of detection elements is for minimizing the influence of external noise that occurs in a transfer motor for transferring a medium. That is, the differential amplifiers 110, 112 and 114 may be called a signal processor for processing a signal.

Each of the differential amplifiers 110, 112 and 114 outputs two signals. For example, when the first differential amplifier 110 is matched with the first and second detection elements 101 and 102, the first differential amplifier 110 subtracts a signal, outputted by the second detection element 102, from a signal outputted from the first detection element 101 and amplifies the subtracted signal. Also, the first differential amplifier 110 subtracts a signal, outputted by the first detection element 101, from a signal outputted from the second detection element 102 and amplifies the subtracted signal. Therefore, the total number of signals outputted from the differential amplifiers 110, 112 and 114 is six.

The medium processing apparatus 10 may further comprise a controller 120 that compares a signal, outputted from each of the detection elements 101 to 106, and signals outputted from each of the differential amplifiers 110, 112 and 114 to determine the authenticity of a medium.

A storage (or memory) 130 stores various pattern information of magnetic component signals for various factors such as the denomination of a transferred medium, the entry direction of the transferred medium, the left/right shift degree of the transferred medium, and the skew of the transferred medium. The pattern information is information for determining the authenticity of the medium.

For example, the pattern information may be classified by denomination of a medium, and entry direction based on the front or rear of the medium. Also, even when the same medium, the pattern information may be classified based on the left/right shift degree of the medium or the skew of the medium.

FIGS. 2 to 5 are diagrams illustrating that the distributions of magnetic components in one medium differ by travel directions for the medium.

Figure 2:
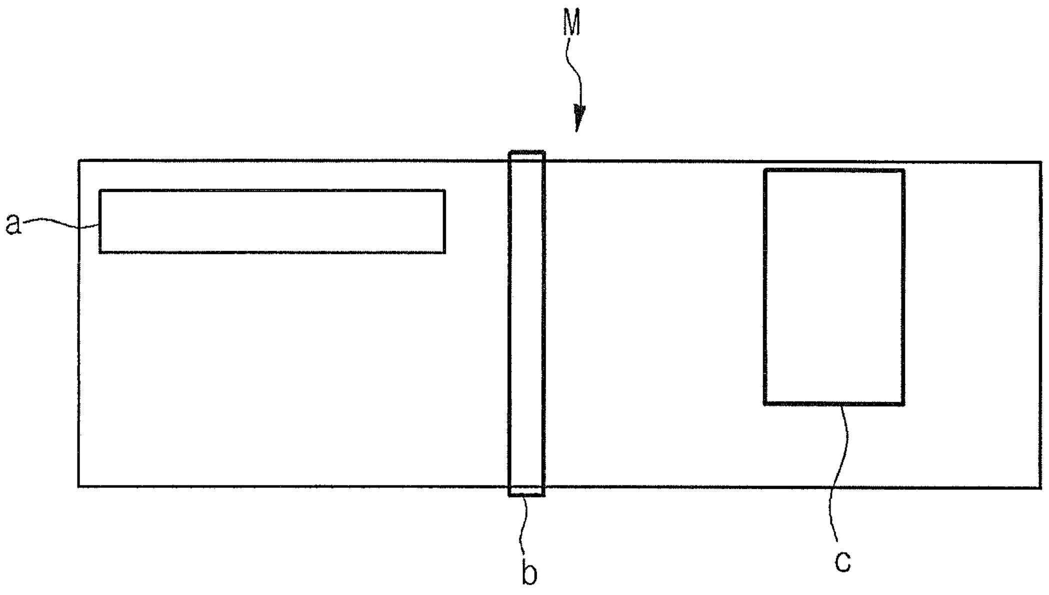
FIGS. 2 to 5 are diagrams illustrating that the distributions of magnetic components in one medium differ by travel directions for the medium.
Figure 3:
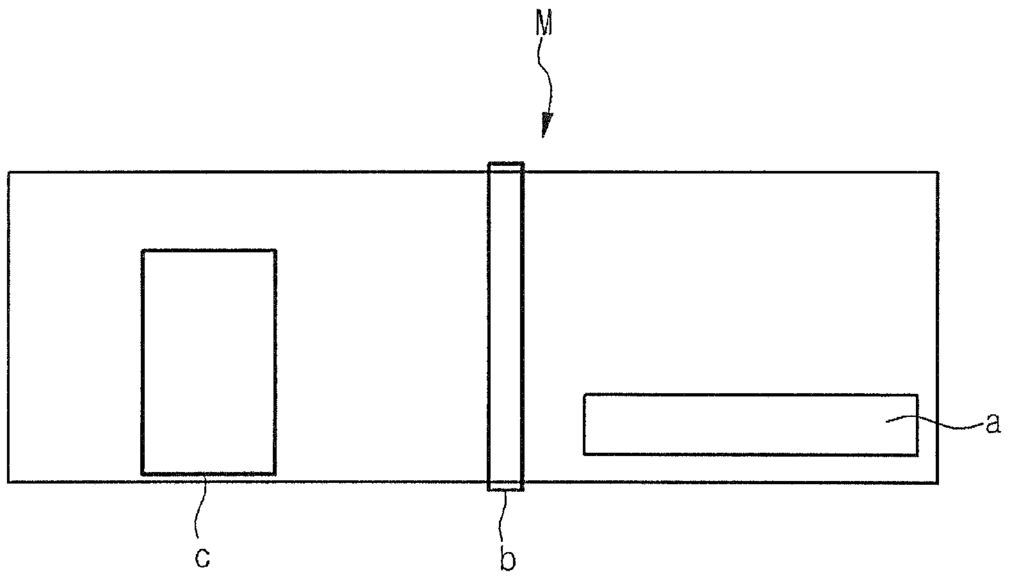
Figure 4:
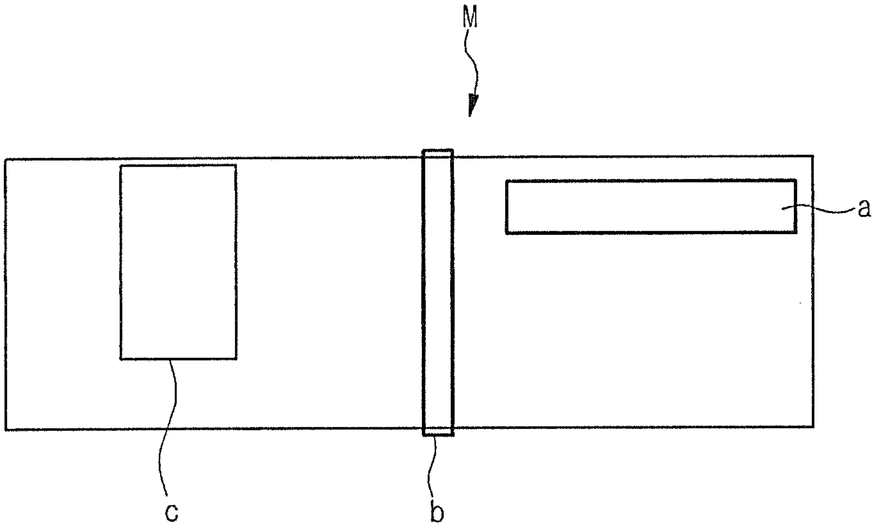
Figure 5:
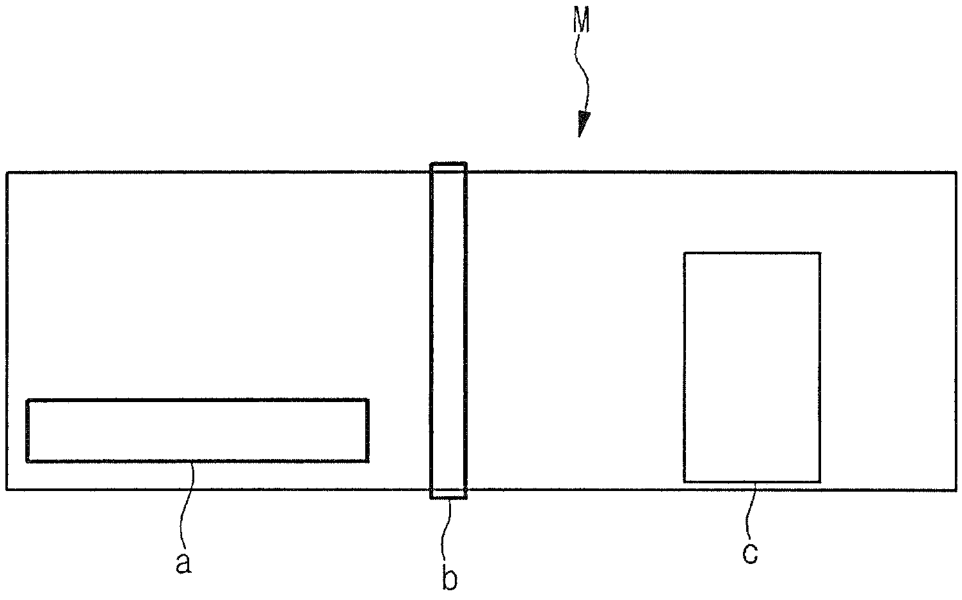

FIG. 2 illustrates magnetic component distributions a to c in a forward direction, on the front of a medium. FIG. 3 illustrates magnetic component distributions a to c in a reverse direction, on the front of the medium. FIG. 4 illustrates magnetic component distributions a to c in a forward direction, on the rear of the medium. FIG. 5 illustrates magnetic component distributions a to c in a reverse direction, on the rear of the medium. In the drawings, a thick solid line indicates a magnetic component having a relatively higher level compared to a thin solid line. When it is assumed that the state of the medium in FIG. 2 is in the forward direction, the reverse direction of the medium in FIG. 3 denotes that the medium of FIG. 2 has been rotated by 180 degrees.

Since signals respectively outputted from the detection element and the differential amplifier differ according to the position of the medium in FIGS. 2 to 5, as described above, the storage 130 stores various pattern information.

Hereinafter, a method of determining the authenticity of a medium will be described in detail.

Figure 6:
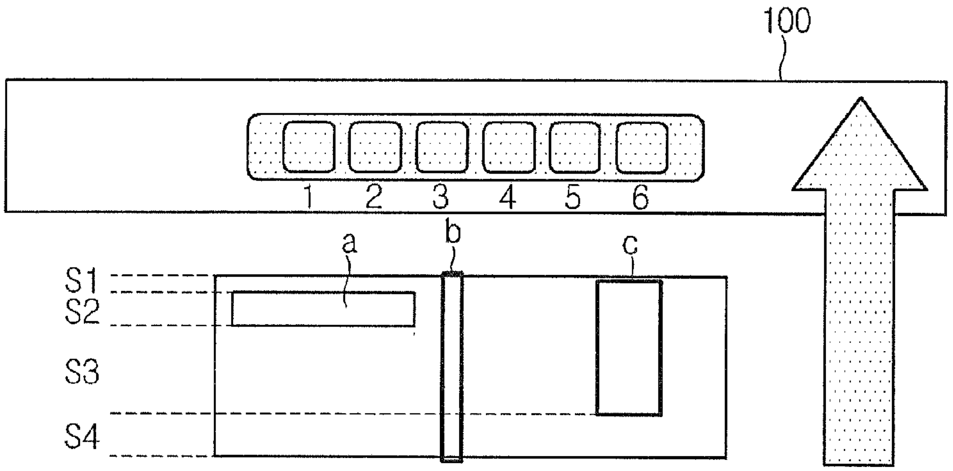
FIG. 6 is a diagram illustrating that a medium passes through a magnetic resistance (MR) sensor in a certain direction.
Figure 7:
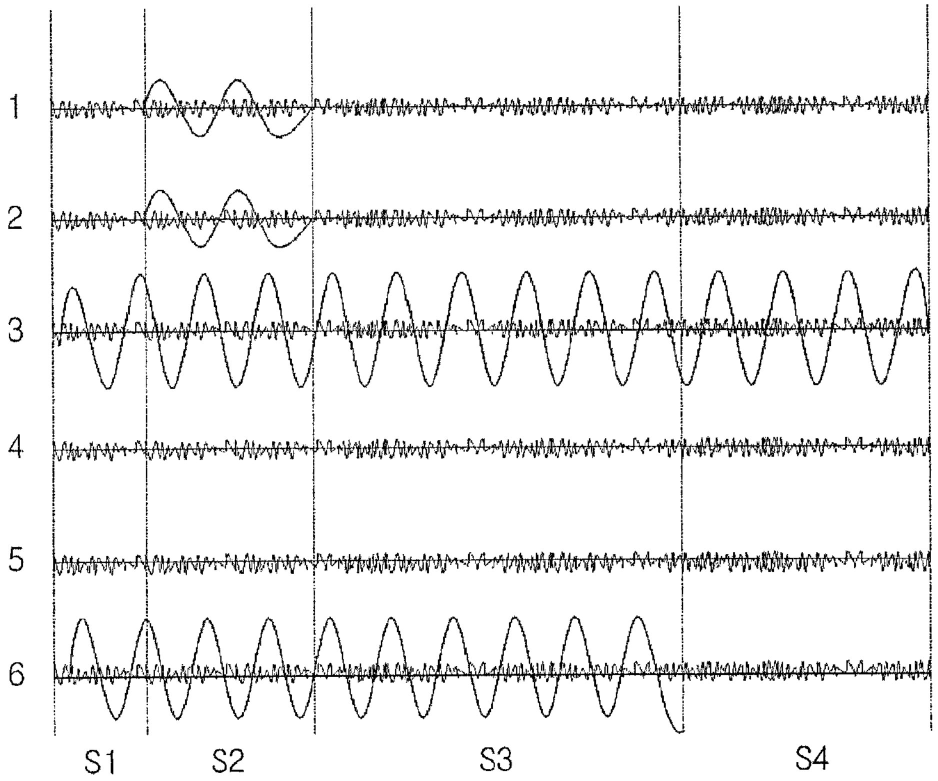
FIG. 7 is a diagram showing a waveform outputted from a detection element.
Figure 8:
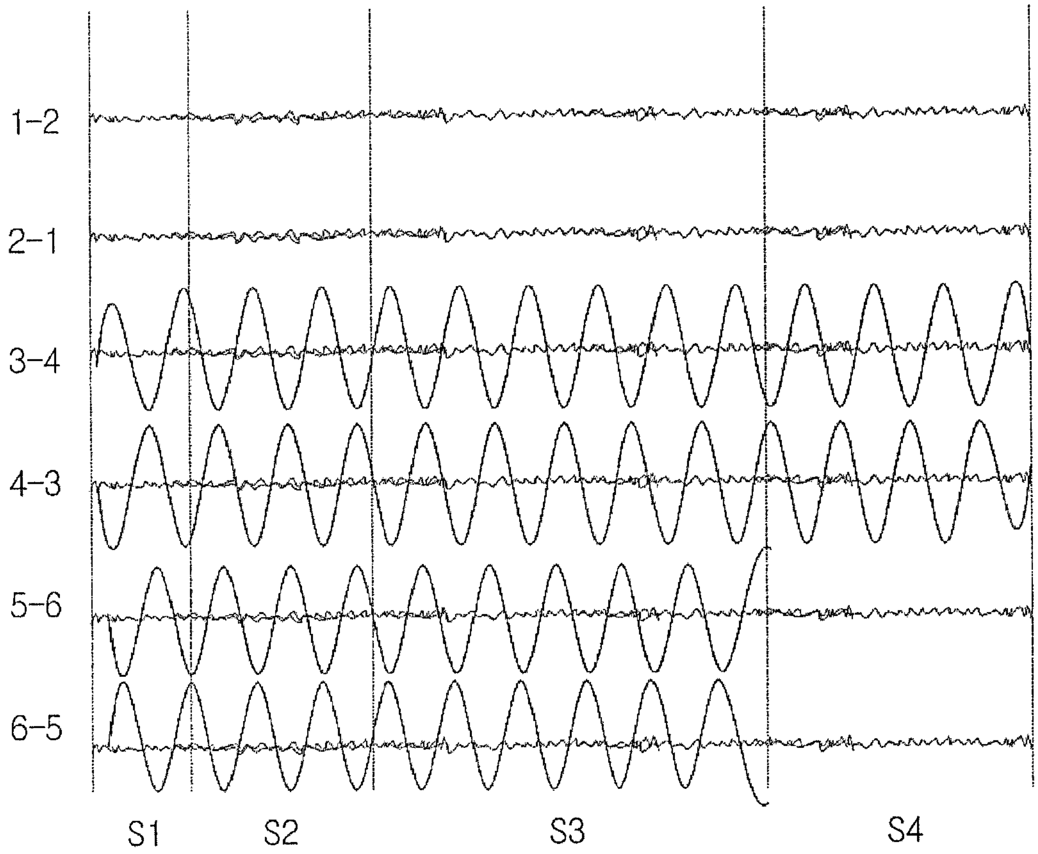
FIG. 8 is a diagram showing a waveform outputted from a differential amplifier.

FIG. 6 is a diagram illustrating that a medium passes through an MR sensor in a certain direction. FIG. 7 is a diagram showing a waveform outputted from a detection element. FIG. 8 is a diagram showing a waveform outputted from a differential amplifier. As an example, FIG. 6 illustrates that a medium is transferred in a forward direction of the front thereof as in FIG. 2. Furthermore, regions b and c are illustrated as larger than a region c in size of a magnetic component of a medium. Also, in FIG. 6, a section enabling the sensing of the presence of a magnetic component is illustrated as being divided into a plurality of sections S1 to S4 with respect to the transfer direction (arrow direction) of a medium. In FIGS. 6 and 7, moreover, the detection elements 101 to 106 are schematically indicated by 1 to 6, respectively.

Referring to FIG. 6, a medium is transferred in an arrow direction. Then, each of the detection elements 101 to 106 detects a magnetic component of a medium corresponding to a detection region thereof.

That is, the first and second detection elements 101 and 102 may detect a magnetic component in the region a of the medium. The third detection element 103 may detect a magnetic component in the region b of the medium. The sixth detection element 106 may detect a magnetic component in the region c of the medium.

FIG. 7 shows a signal outputted from each of the detection elements 101 to 106 when the medium passes through the detection elements 101 to 106.

Referring to FIG. 7, the first and second detection elements 101 and 102 may detect a magnetic component only in the section S1 in the region a. The third detection element 103 detects a magnetic component in the sections S1 to S4 in the region b. The sixth detection element 106 may detect a magnetic component in the sections S1 to S3 in the region b. On the other hand, the fourth and fifth detection elements 104 and 105 do not detect a magnetic component.

In the waveform diagram of FIG. 7, signals other than a magnetic component signal are noises.

The signals respectively outputted from the detection elements 101 to 106 are delivered to the controller 120 and the deferential amplifiers 110, 112 and 114. In this case, the signals respectively outputted from the first and second detection elements 101 and 102 are delivered to the first differential amplifier 110, the signals respectively outputted from the third and fourth detection elements 103 and 104 are delivered to the second differential amplifier 112, and the signals respectively outputted from the fifth and sixth detection elements 105 and 106 are delivered to the third differential amplifier 114.

The first differential amplifier 110 mutually subtracts and amplifies the two delivered signals. Thus, a magnetic component signal with noise removed therefrom is outputted from each of the first to third differential amplifiers 110, 112 and 114.

A portion 1-2 of FIG. 8 shows that the signal of the second detection element 102 has been subtracted from that of the first detection element 101. A portion 2-1 of FIG. 8 shows that the signal of the first detection element 101 has been subtracted from that of the second detection element 102. A portion 3-4 of FIG. 8 shows that the signal of the fourth detection element 104 has been subtracted from that of the third detection element 103. A portion 4-3 of FIG. 8 shows that the signal of the third detection element 103 has been subtracted from that of the fourth detection element 104. A portion 5-6 of FIG. 8 shows that the signal of the sixth detection element 106 has been subtracted from that of the fifth detection element 105. A portion 6-5 of FIG. 8 shows that the signal of the fifth detection element 105 has been subtracted from that of the sixth detection element 106.

The controller 120 compares information, stored in the storage 130, with the output signals of the respective detection elements 101 to 106 and the output signals of the respective differential amplifiers 110, 112 and 114 to determine the authenticity of a medium. The controller 120 may determine the denomination of a medium that is being transferred, the entry direction of the medium, the left/right shift degree of the medium, and the skew of the medium, on the basis of pattern information stored in the storage 130.

When the output signals of the respective detection elements 101 to 106 and the output signals of the respective differential amplifiers 110, 112 and 114 are matched with the information stored in the storage 130, the controller 120 determines the medium as being authorized.

In the embodiment, the signal outputted from each of the detection elements 101 to 106 may be referred to as a first signal, and the signal outputted from each of the differential amplifiers 110, 112 and 114 may be referred to as a second signal.

In the embodiment, furthermore, a differential amplifier mutually subtracts and amplifies signals outputted from a pair of detection elements to output two signals. On the contrary, a detection element may subtract and amplify another detection element to output one signal.

In the embodiment, moreover, signals respectively outputted from two adjacent detection elements are delivered to a differential amplifier, but signals respectively outputted from two nonadjacent detection elements may be delivered to a differential amplifier.

In the embodiment, the authenticity of a medium can be more accurately determine through the combination of combining an MR sensor and one or more other sensors. For example, the authenticity of a medium may be determined by using an MR sensor and an image sensor together. That is, the authenticity of a medium may be determined by comparing characteristic information for denomination of the medium, which has been detected by an MR sensor with a magnetic component signal, and characteristic information for denomination of the medium that has been detected by an image sensor using image information detected by the image sensor.

According to the above-described embodiments, the medium processing apparatus mutually subtracts and amplifies the two or more of a plurality of signals respectively outputted from a plurality of detection elements, and determines the authenticity of the medium with the mutually subtracted and amplified signal, more accurately determining the authenticity of the medium.

In the embodiments, the MR sensor has been described above as comprising six detection elements as an example, but the number of detection elements is not limited thereto. That is, an MR sensor comprising an appropriate number of detection elements may be applied in consideration of the size of a transfer path through which a medium is transferred, the size of the MR sensor, and the size of the detection element.

In the embodiments, moreover, a detection element is comprised as even number, and signals respectively outputted from adjacent detection elements are subtracted mutually. However, even when an MR sensor comprises an odd number of detection elements, the spirit and scope of the embodiments may be applied. In this case, a signal outputted from the last detection element may be delivered to a controller as-is. The last detection element may be disposed at a right portion or a left portion in an array of detection elements, or disposed at the center portion of the array.

Even though all the elements of the embodiments are coupled into one or operated in the combined state, the present disclosure is not limited to such an embodiment. That is, all the elements may be selectively combined with each other without departing the scope of the invention.

Furthermore, when it is described that one comprises (or comprises or has) some elements, it should be understood that it may comprise (or comprise or has) only those elements, or it may comprise (or comprise or have) other elements as well as those elements if there is no specific limitation. Unless otherwise specifically defined herein, all terms comprising technical or scientific terms are to be given meanings understood by those skilled in the art. Like terms defined in dictionaries, generally used terms needs to be construed as meaning used in technical contexts and are not construed as ideal or excessively formal meanings unless otherwise clearly defined herein.

Although embodiments have been described with reference to a number of illustrative embodiments thereof, it will be understood by those skilled in the art that various changes in form and details may be made therein without departing from the spirit and scope of the invention as defined by the appended claims. Therefore, the preferred embodiments should be considered in descriptive sense only and not for purposes of limitation, and also the technical scope of the invention is not limited to the embodiments. Furthermore, is defined not by the detailed description of the invention but by the appended claims, and all differences within the scope will be construed as being comprised in the present disclosure.

What is claimed is:

1. A medium processing apparatus comprising:

a magnetic resistance (MR) sensor comprising a plurality of detection elements configured to detect a magnetic component of a medium;

one or more differential amplifiers configured to receive respective output signals of two detection elements among the plurality of detection elements to subtract and amplify the received signals;

a storage configured to store various pattern information of a magnetic component signal for the medium; and a controller configured to compare the pattern information, stored in the storage, with both magnetic component signals respectively outputted from the detection elements and a magnetic component signal outputted from the one or more differential amplifiers to determine authenticity of the medium.

2. The medium processing apparatus of claim 1, wherein the two detection elements are adjacent.

3. The medium processing apparatus of claim 1, wherein the one or more differential amplifiers output a signal which is obtained by subtracting an output signal of a first detection element of two detection elements from an output signal of a second detection element of the two detection elements to amplify the subtracted signal, and a signal which is obtained by subtracting the output signal of the second detection element from the output signal of the first detection element to amplify the subtracted signal.

4. The medium processing apparatus of claim 1, wherein the detection elements are comprised as even number.

5. The medium processing apparatus of claim 1, wherein, the detection elements are comprised as odd number, and an output signal of one of the detection elements is not delivered to the one or more differential amplifiers.

6. The medium processing apparatus of claim 1, further comprising an image sensor acquiring image information of the medium, wherein the controller compares characteristic information for denomination of the medium which is acquired with the magnetic component signals and characteristic information for denomination of the medium which is acquired with the image information to determine authenticity of the medium.

7. A financial device comprising:

a transfer path for transfer of a medium; and a medium processing apparatus configured to recognize a medium which is transferred along the transfer path of the medium, wherein the medium processing apparatus comprises:

a magnetic resistance (MR) sensor comprising a plurality of detection elements configured to detect a magnetic component of the medium;

a signal processor configured to process signals respectively outputted from the detection elements; and a controller configured to determine authenticity of the medium by using both magnetic component signals respectively outputted from the detection elements and the processed signals.

8. The financial device of claim 7, wherein the signal processor subtract and amplifies signals respectively outputted from two adjacent detection elements.

9. The financial device of claim 7, wherein the signal processor outputs a signal which is obtained by subtracting an output signal of a first detection element of two detection elements from an output signal of a second detection element of the two detection elements to amplify the subtracted signal, and a signal which is obtained by subtracting the output signal of the second detection element from the output signal of the first detection element to amplify the subtracted signal.

10. The financial device of claim 7, wherein, the medium processing apparatus further comprises a storage storing various pattern information of a magnetic component signal for the medium, and the controller compares the pattern information, stored in the storage, with magnetic component signals respectively outputted from the detection elements and a signal outputted from the signal processor to determine authenticity of the medium.

11. A medium processing method comprising:

detecting a plurality of first magnetic component signals for a plurality of regions of a medium;

detecting one or more second magnetic component signals by processing the detected signals; and comparing a pre-stored magnetic component signal for each medium with both the plurality of first magnetic component signals and the one or more second magnetic component signals to determine authenticity of the medium.

12. The medium processing method of claim 11, wherein the detecting of one or more second magnetic component signals comprising subtracting and amplifying the plurality of first magnetic component signals.

13. The medium processing method of claim 12, wherein the processing the detected signals comprising mutually subtracting and amplifying two first magnetic component signals to output two second magnetic component signals.

* * * * *